(12) United States Patent
Vermeersch et al.

(10) Patent No.: US 12,351,084 B2
(45) Date of Patent: Jul. 8, 2025

(54) VEHICLE STRUCTURE WITH FACILITATED ACCESS FOR THE PASSENGER

(71) Applicant: Komma AG, Lugano (CH)

(72) Inventors: Lowie Vermeersch, Turin (IT); Goran Popovic, Riva presso Chieri (IT)

(73) Assignee: KOMMA AG, Lugano (CH)

( * ) Notice: Subject to any disclaimer, the term of this patent is extended or adjusted under 35 U.S.C. 154(b) by 340 days.

(21) Appl. No.: 17/906,024

(22) PCT Filed: Feb. 10, 2021

(86) PCT No.: PCT/IB2021/051065
§ 371 (c)(1),
(2) Date: Sep. 9, 2022

(87) PCT Pub. No.: WO2021/181175
PCT Pub. Date: Sep. 16, 2021

(65) Prior Publication Data
US 2023/0100187 A1    Mar. 30, 2023

(30) Foreign Application Priority Data

Mar. 10, 2020   (IT) ................. 102020000005095

(51) Int. Cl.
*B60N 2/12* (2006.01)
*B60N 2/01* (2006.01)
(Continued)

(52) U.S. Cl.
CPC ............. *B60N 2/12* (2013.01); *B60N 2/01* (2013.01); *B60N 2/06* (2013.01); *B60R 11/04* (2013.01);
(Continued)

(58) Field of Classification Search
CPC ... B60N 2/12; B60N 2/01; B60N 2/06; B60N 2/919; B60N 2/4221; B60N 2/146;
(Continued)

(56) References Cited

U.S. PATENT DOCUMENTS 3,813,018 A * 5/1974 Heltzen .................... B62J 1/28
224/438
8,226,120 B2 * 7/2012 Berg ....................... B62K 5/01
180/326
(Continued)

FOREIGN PATENT DOCUMENTS

DE    19508675 A1 *  1/1996  ............. B60N 2/01
DE    19824012 A1 * 12/1999  ............. B60R 11/04
(Continued)

OTHER PUBLICATIONS

Mohr (DE 19508675 A1), machine translation (Year: 1996).*
(Continued)

*Primary Examiner* — Amy R Weisberg
*Assistant Examiner* — Wenwei Zhuo
(74) *Attorney, Agent, or Firm* — Heslin Rothenberg Farley & Mesiti P.C.; Victor A. Cardona, Esq.

(57) ABSTRACT

Vehicle structure includes a front seat for a driver and a rear seat for a passenger aligned with each other. The front seat is slidable and/or tiltable between a rearward position, in which it is rigidly secured to the frame of the rear seat by a
(Continued)

releasable locking device, and a forward position, in which a gap is formed between the front seat and the rear seat to facilitate the access and exit of the passenger.

19 Claims, 15 Drawing Sheets

(51) Int. Cl.
    *B60N 2/06*         (2006.01)
    *B60R 11/04*       (2006.01)
    *B60N 2/68*         (2006.01)
    *B60R 9/06*         (2006.01)
    *B60R 21/231*      (2011.01)
    *B60R 25/00*       (2013.01)

(52) U.S. Cl.
    CPC ............... *B60N 2/688* (2013.01); *B60R 9/065* (2013.01); *B60R 21/23138* (2013.01); *B60R 25/002* (2013.01)

(58) Field of Classification Search
    CPC .......... B60N 2/14; B60N 2/0825; B60N 2/08; B60N 2002/948; B60R 11/04; B62J 1/00; B62J 1/12; B62J 1/04; B62J 1/14
    USPC .......... 296/63, 64, 65.01, 65.13; 297/195.12, 297/341, 344.1, 316, 313, 257
    See application file for complete search history.

(56) References Cited

U.S. PATENT DOCUMENTS

| | | | |
|---|---|---|---|
| 2004/0079561 A1* | 4/2004 | Ozawa | B60P 3/423 180/21 |
| 2010/0320012 A1* | 12/2010 | Stappen | B60L 53/80 180/65.1 |
| 2017/0323179 A1* | 11/2017 | Vallespi-Gonzalez | G06V 20/58 |

FOREIGN PATENT DOCUMENTS

| | | | | |
|---|---|---|---|---|
| FR | 2950004 A1 | 3/2011 | | |
| IT | MI20000621 U1 | 5/2022 | | |
| WO | WO-9954188 A1 * | 10/1999 | | B60N 2/01 |

OTHER PUBLICATIONS

Daberkow et al. (DE 19824012 A1), machine translation (Year: 1999).*

International Search Report and Written Opinion of International Application No. PCT/IB2020/051065, mailed May 11, 2021, 10 pages.

* cited by examiner

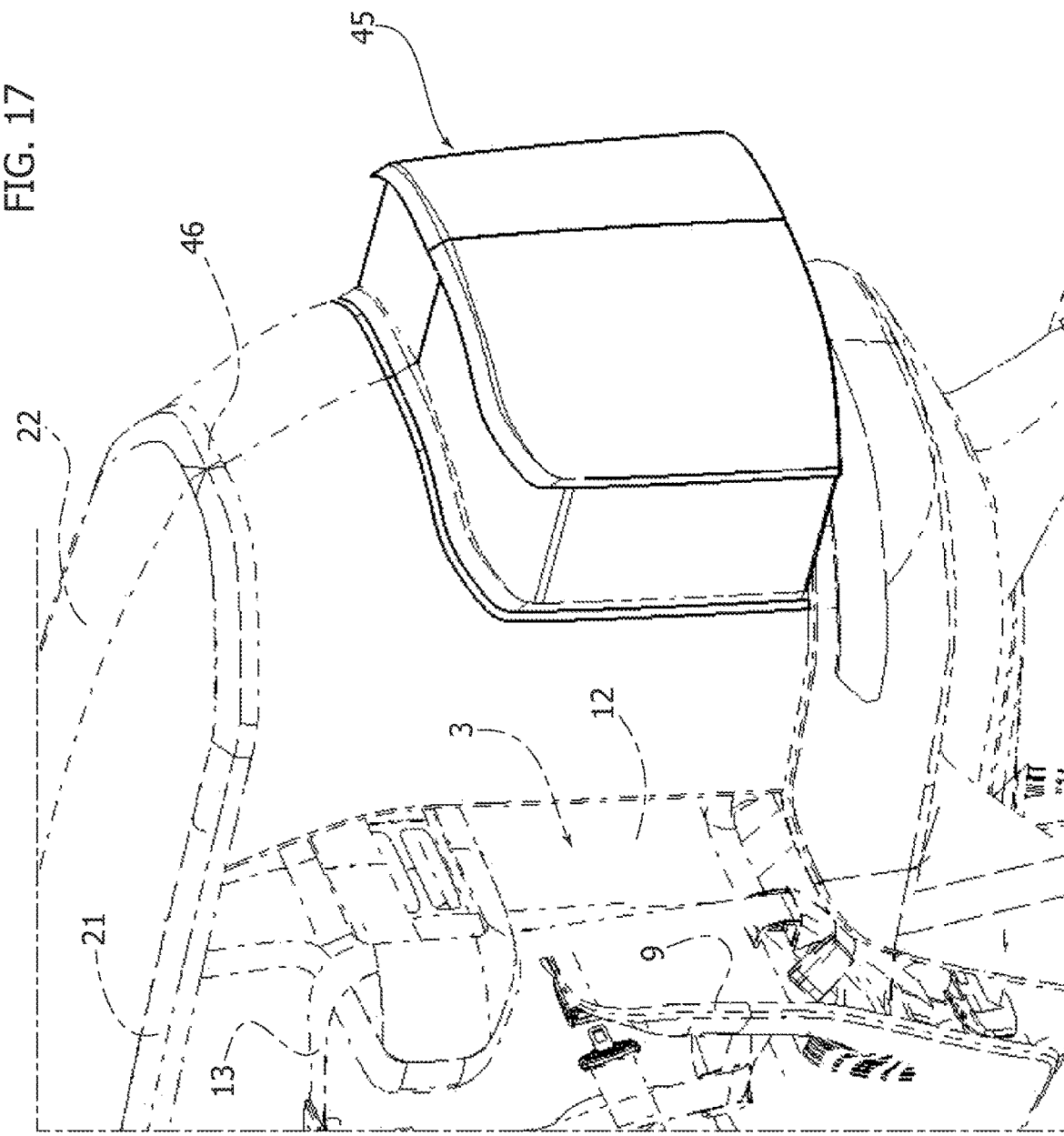

VEHICLE STRUCTURE WITH FACILITATED ACCESS FOR THE PASSENGER

CROSS REFERENCE TO RELATED APPLICATIONS

This application is a national stage filing under Section 371 of International Application No. PCT/IB2021/051065, filed Feb. 10, 2021, published in English on Sep. 16, 2021, as WO 2021/181175 and which claims priority from Italian Patent Application No. 102020000005095 filed on Mar. 10, 2020, the entire disclosures of which are incorporated herein by reference.

FIELD OF THE INVENTION

The present invention relates to a vehicle structure provided with a single front seat for a driver and a single rear seat for a passenger aligned with each other along the longitudinal axis of the vehicle. More particularly, the invention relates to a structure thus made in which the front seat is slidable along a guide between a rearward position and a forward position.

STATE OF THE PRIOR ART

A multitude of vehicles provided with four wheels which can neither be classified as motor vehicles or quadricycles are currently available on the market. Such vehicles typically have frames carrying sitting portions similar to those of motorcycles, for example a single saddle arranged for the sitting of both passengers, and they are provided with four wheels to confer comfort and stability of a motor vehicle to the vehicle while maintaining the manoeuvrability and low weights of a motorcycle.

A drawback common to such vehicles arises from the conventional saddle-like sitting portion, which, in particular for the passenger, entails a considerable difficulty in accessing into and exiting from the vehicle, especially if the driver is already sitting on the saddle or if the vehicle is provided with a rigid-frame roof or an object-holder trunk. Furthermore, the absence of a backrest, possibly provided with safety belts, for both sitting portions reduces the comfort of the passengers, forces them to use the helmet and exposes the passenger to greater risk of injury in the event of an accident.

A vehicle currently available on the market provided with a motorcycle chassis and provided with a motor vehicle sitting portion is BMW Cl. Such vehicle comes with two different configurations; the first one provides for a sitting portion without an upholstery, protruding outside the frame of the roof and it is designed as a support for an object-holder trunk; the second provides for a seat-like rear extension of the saddle, which has the disadvantage of a considerable difficulty of access for the passenger who has to lift one leg above and beyond such extension before being able to sit.

There is therefore a need for a vehicle having the characteristics typical of a motor vehicle and the comfort, safety and ease of access for the passengers typical of a motor vehicle.

SUMMARY OF THE INVENTION

The object of the present invention is to overcome the aforementioned drawbacks. In order to achieve such object, the invention relates to a vehicle structure of the type defined in the preamble of claim 1, provided with a front seat slidable along a guide, whose primary characteristic lies in the fact that in the rearward position, the front seat is in contact with the frame of the rear seat and it is rigidly secured thereto by means of a releasable locking device, e in the forward position of the seat, an access space is formed between the front seat and the frame of the rear seat so as to facilitate the access and exit of the passenger.

Thanks to this solution idea, it is possible to provide a vehicle which has the advantages derived from the comfort and safety of the seats of the motor vehicle type, while maintaining the characteristics of manoeuvrability and lightness typical of a motorcycle or scooter.

In an embodiment of the invention, the front seat is also tiltable with respect to a transverse axis between a rearward driving position of the vehicle and a forward position to facilitate the access and exit of the passenger.

According to the invention, the front seat conveniently comprises at least one bracket protruding from the frame of the front seat, said bracket being hinged to at least one corresponding pin integrally joined with the central frame portion, or vice versa, to allow the aforementioned rotation of the front seat.

In a preferred embodiment of the invention, the rear seat is provided with safety belts and, in the event of frontal collision of the vehicle, said locking device is configured to transfer the tensile loads that occur on the safety belts to the frame of the rear seat.

According to the invention, the aforementioned releasable locking device conveniently comprises at least one pin integrally joined with the frame of the rear seat and at least one corresponding hole, integrally joined with the frame of the front seat and provided with elements for locking the pin, or vice versa. This locking device can be released by means of a lever arranged to actuate the locking elements of the hole so as to release the pin.

According to the invention, the aforementioned front seat guide may comprise an intermediate frame from which a pair of side sleeves and a central sleeve which allow the front seat to slide by means of a linear electric actuator. This allows to adjust the distance between the front seat and the rear seat. Even such electric actuator may conveniently be actuated by using an electronic device such as a mobile phone, tablet and the like. Thanks to this solution idea it is possible to adjust the position of the front seat as a function of the height of the driver, while maintaining safety and ease of access of the passenger, typical of the vehicle structure according to the invention, intact. Furthermore, this allows to memorise customised driving positions as well as customisation with sharing applications.

In a preferred embodiment according to the invention, the releasable locking device comprises an electric lock, for example provided with an electromagnet, which can be actuated by using an electronic device such as a mobile phone, tablet and the like.

In a further embodiment according to the invention, the electric lock, the fork, the sleeves, the linear actuator and the intermediate frame are comprised in a single device integrally joined with the front seat frame.

The vehicle structure according to the invention may be provided with two, three or four wheels. The three-wheel configuration may provide for a pair of steered front wheels or a pair of driving rear wheels. The vehicle may be driven by at least one electric, internal-combustion or hybrid engine. The electric engine/s may be installed in the wheels of the vehicle.

In an embodiment, the vehicle structure comprises a roof supported by a frame which is provided with at least one pair of side airbags arranged to protect the driver and the passenger in the event of side collisions. Furthermore, the vehicle structure according to the invention may comprise a further front airbag arranged on the backrest of the front seat to protect the passenger in the event of frontal collision and/or at least one front airbag carried by the front frame portion or by the handlebar to protect the driver in the event of frontal collision or with minimal side component.

In a further embodiment, the structure comprises a front video camera, for example installed on a front portion of the frame, and a monitor or TFT (Thin Film Transistor) supported by the backrest of the front seat. The video camera images are transmitted in real time on the monitor to provide the passenger with a view of the route.

In an embodiment of the invention, the central frame portion comprises a pair of upper crosspieces supporting the guide or the device for adjusting and tilting the front seat, a pair of lower crosspieces, and a plurality of uprights connecting the pairs of crosspieces so as to form—therewith—a structure arranged for housing batteries if required. The rear seat frame comprises a pair of upper crosspieces supporting said sitting portion of the passenger seat, a plurality of uprights connecting said pair of crosspieces to the central frame portion, and a support horizontally connecting said pair of crosspieces to each other and supporting at least one pin.

In a further embodiment, the space formed between the front seat and the rear seat frame, in the forward position of the front seat, extends inferiorly and posteriorly to the aforementioned upper crosspieces supporting the guide or the device for adjusting and tilting the front seat.

In a further embodiment, the vehicle structure according to the invention comprises a flexible storage compartment convertible from a first closed configuration, in which it is stowed either behind the backrest of the rear seat or inside an external trunk, to a second open operative configuration in which the compartment rests on the sitting portion of the rear seat, or it protrudes posteriorly from the rear part of the frame.

In a further embodiment, the battery can be removed from the structure arranged to house the battery so as to slide posteriorly between the rear wheels for replacement.

BRIEF DESCRIPTION OF THE DRAWINGS

Further characteristics of the invention will be apparent from the following detailed description, with reference to the attached drawings, provided by way of non-limiting example, wherein:

FIGS. 16 and 17 are perspective views—on an enlarged scale—of a part of the vehicle structure according to the invention showing two different configurations of a storage compartment.

DETAILED DESCRIPTION OF THE INVENTION

Figure 1:
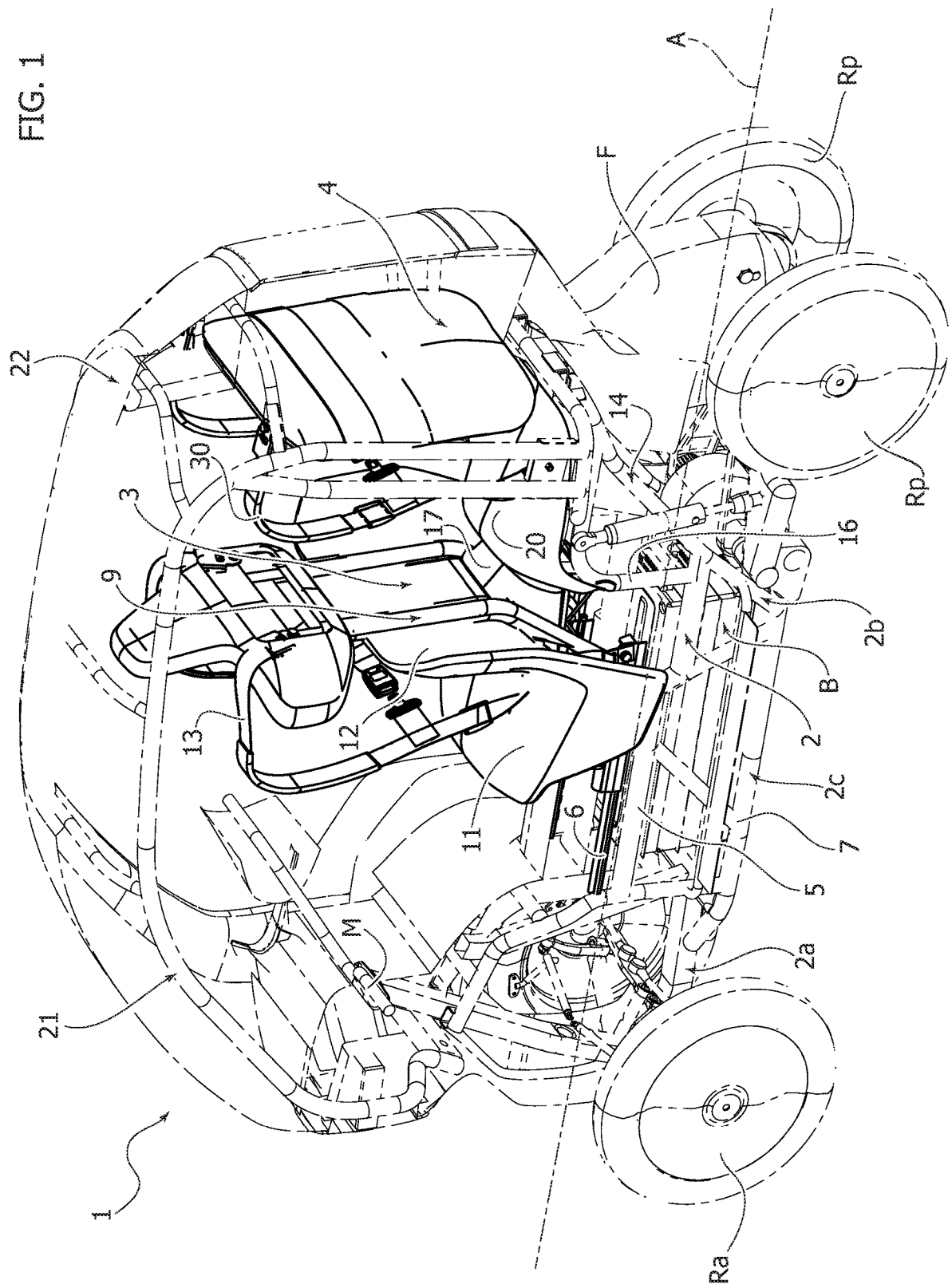
FIG. 1 is a schematic and partially sectional perspective view of an embodiment of the vehicle structure according to the invention.

FIG. 1 shows a first embodiment of the vehicle structure 1 according to the invention comprising four wheels Ra, Rp, a frame 2 of the motorcycle type having a longitudinal axis A, a single front seat 3 for a driver G and a single rear seat 4 for a passenger P aligned with each other along such longitudinal axis A.

Thus, given that the vehicle 1 is of the generally conventional type, only the essential components and the components expressly referred to in the invention will be described.

A front frame portion 2a carries the pair of front wheels Ra, which tilt in a conventional manner to allow the vehicle 1 to tilt like a motorcycle, and steered by means of a conventional handlebar M. A rear frame portion 2b carries the pair of rear wheels Rp which also tilt in a conventional manner.

Figure 2:
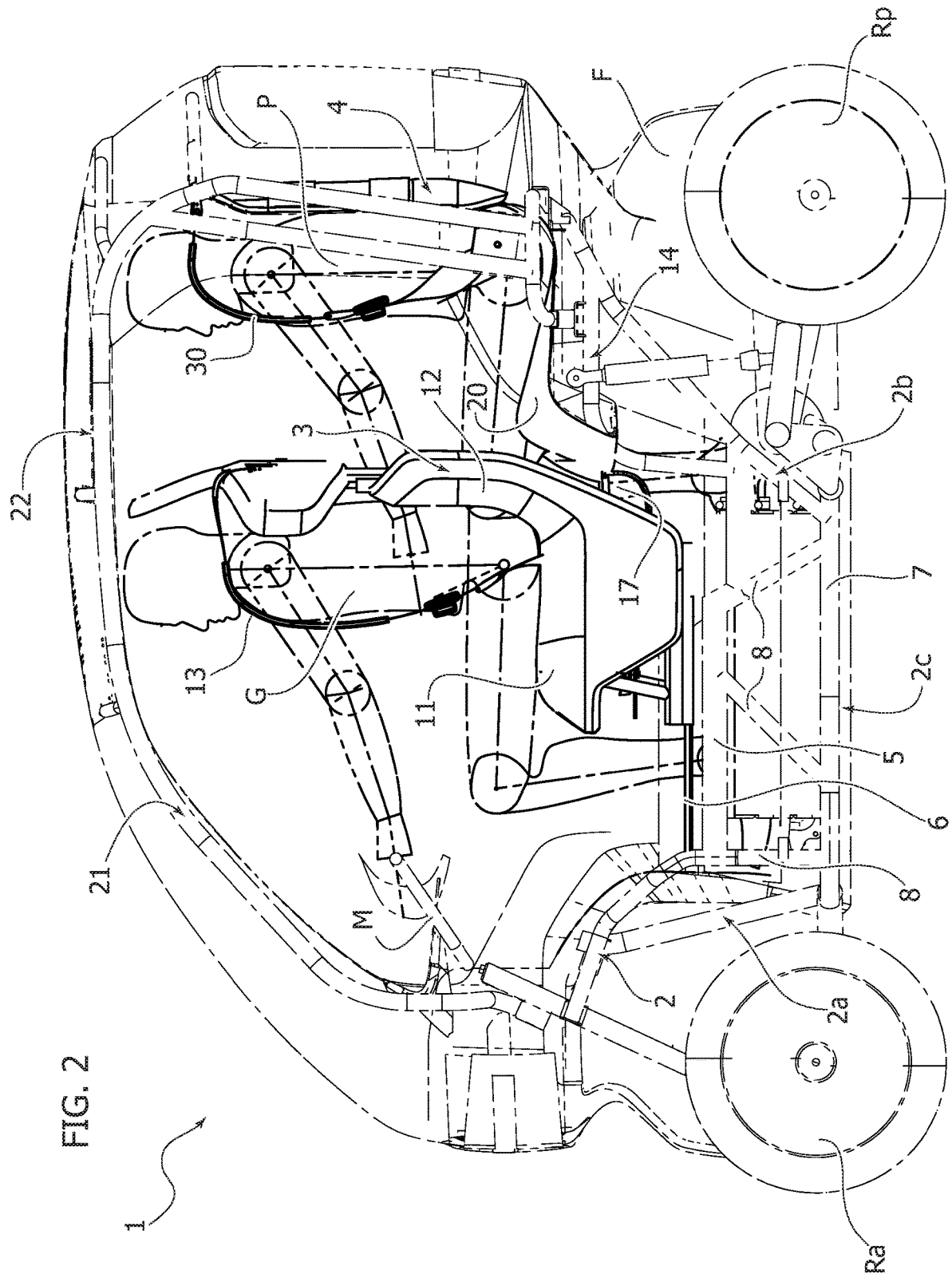
FIG. 2 is a lateral elevational view of FIG. 1.

As better observable in FIGS. 2 and 3, the central frame portion 2c comprises a pair of upper crosspieces 5 supporting a guide 6 of the front seat 3 as will be described hereinafter, a pair of lower crosspieces 7, and three pairs of uprights 8 connecting the pairs of crosspieces 5, 7 so as to form—therewith—a box-like structure for housing batteries B if required.

The vehicle 1 comprises—in a conventional manner—a frame 21 for a roof 22 and it is actuated by an electric engine, not shown since it is known to the man skilled in the art, arranged in a suitable housing F provided for between the rear wheels Rp.

Figure 3:
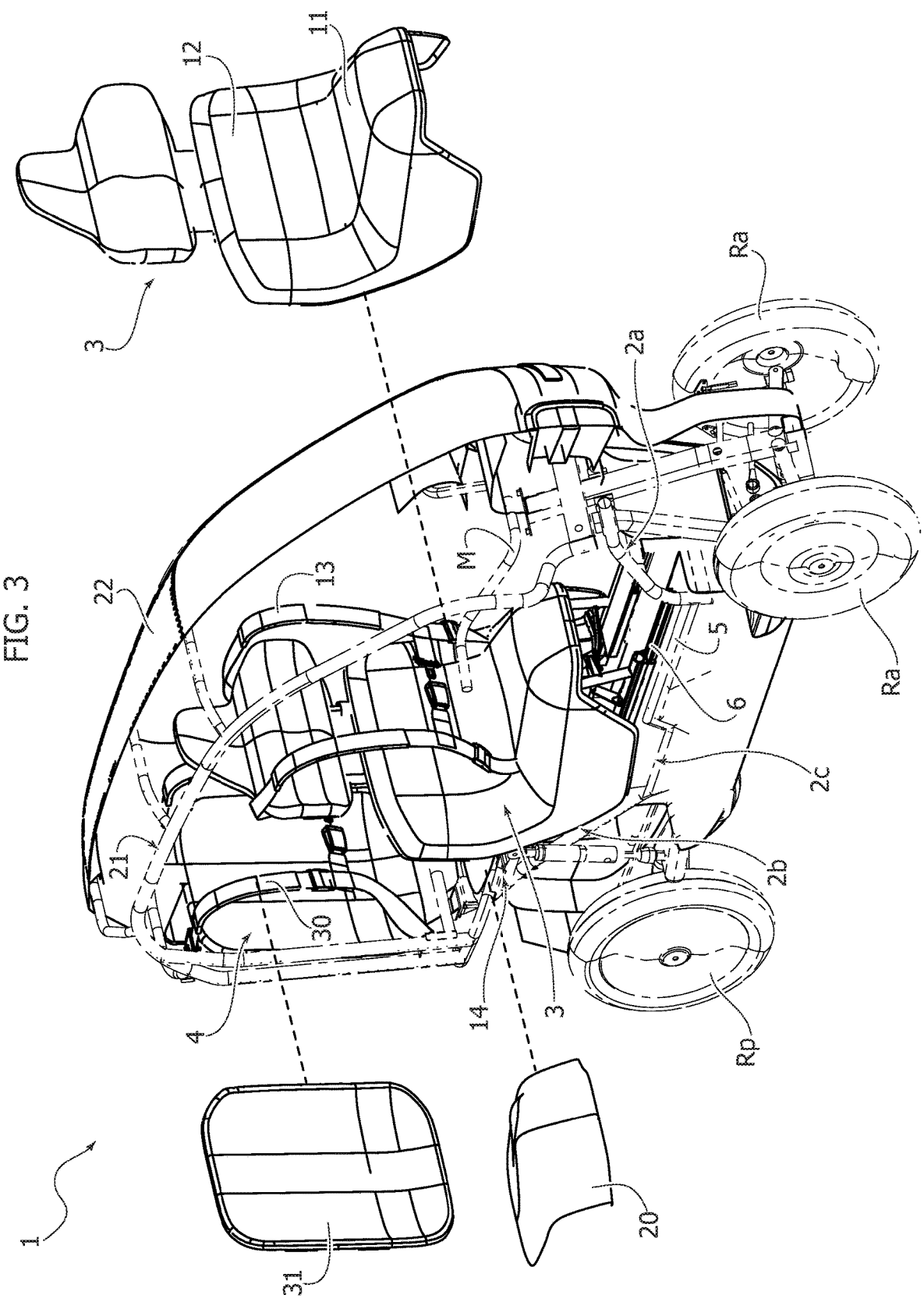
FIG. 3 is a perspective view with some exploded details of FIG. 1, FIGS. 4 and 5 are perspective views—on an enlarged scale—of a part of FIG. 1 showing two different configurations of the structure according to the invention.
Figure 4:
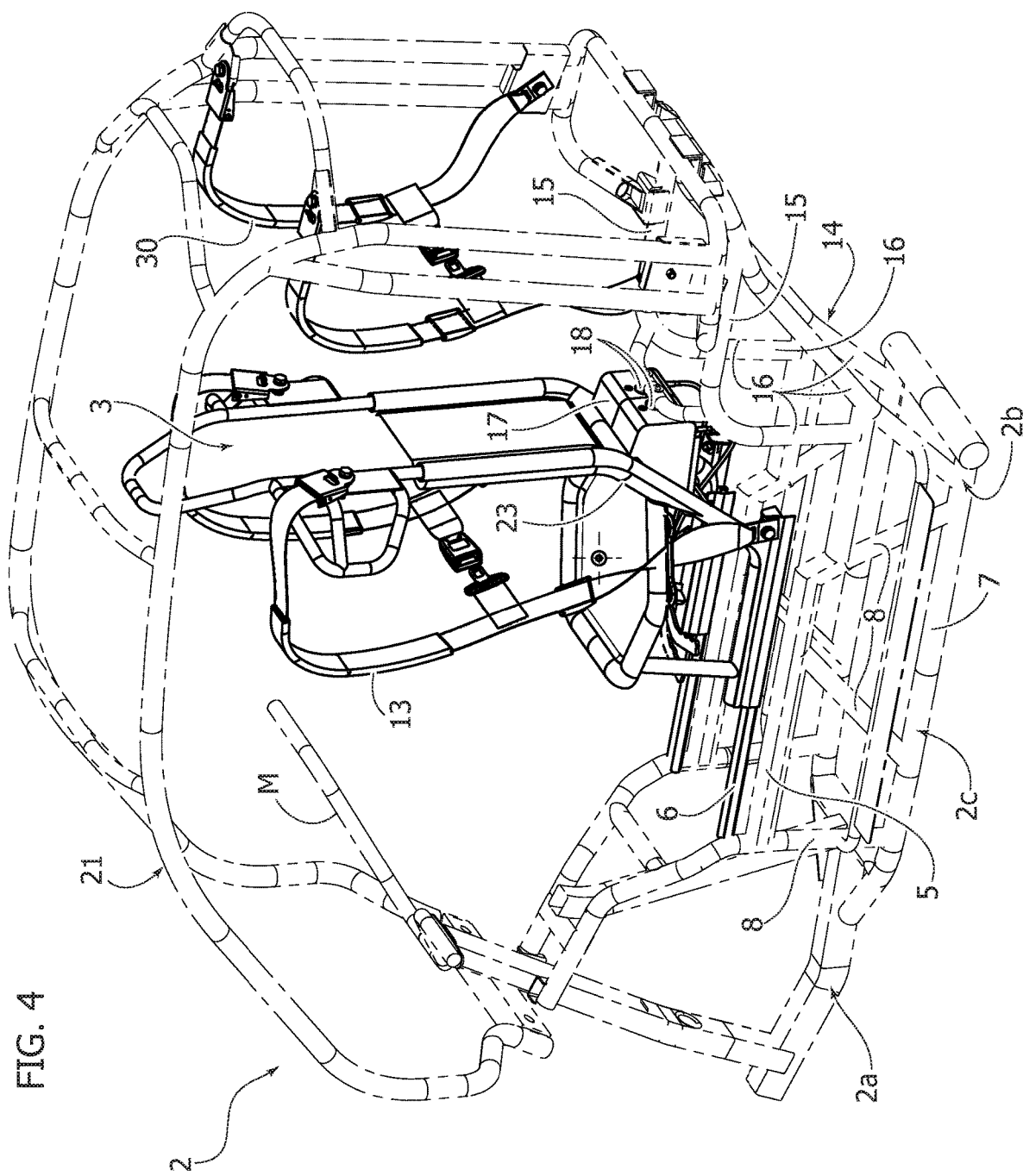

Now, with reference to FIGS. 3 and 4, the front seat 3 comprises a frame 9 supporting a station of the motor vehicle type comprising a sitting portion 11, a backrest 12 and a pair of safety belts 13 with four points for anchoring to the frame 9. As better observable in FIG. 5, the front seat 3 further comprises a rear appendage 17, protruding from the sitting portion 11 and provided on which is a pair of holes 18, each provided with respective releasable locking elements 10, as will be described hereinafter.

The rear seat 4 comprises a frame 14 which includes a pair of upper crosspieces 15 carrying a sitting portion 20, two pairs of uprights 16 connecting the pair of crosspieces 15 to the central frame portion 2c, and a support 23 horizontally connecting the pair of crosspieces 15 to each other and supporting a pair of pins 19, better visible in FIG. 5, as will be described hereinafter. The rear seat 4 is also provided with a backrest 31 and with four-point coupling safety belts 30 carried by the rear portion of the frame 21.

Figure 5:
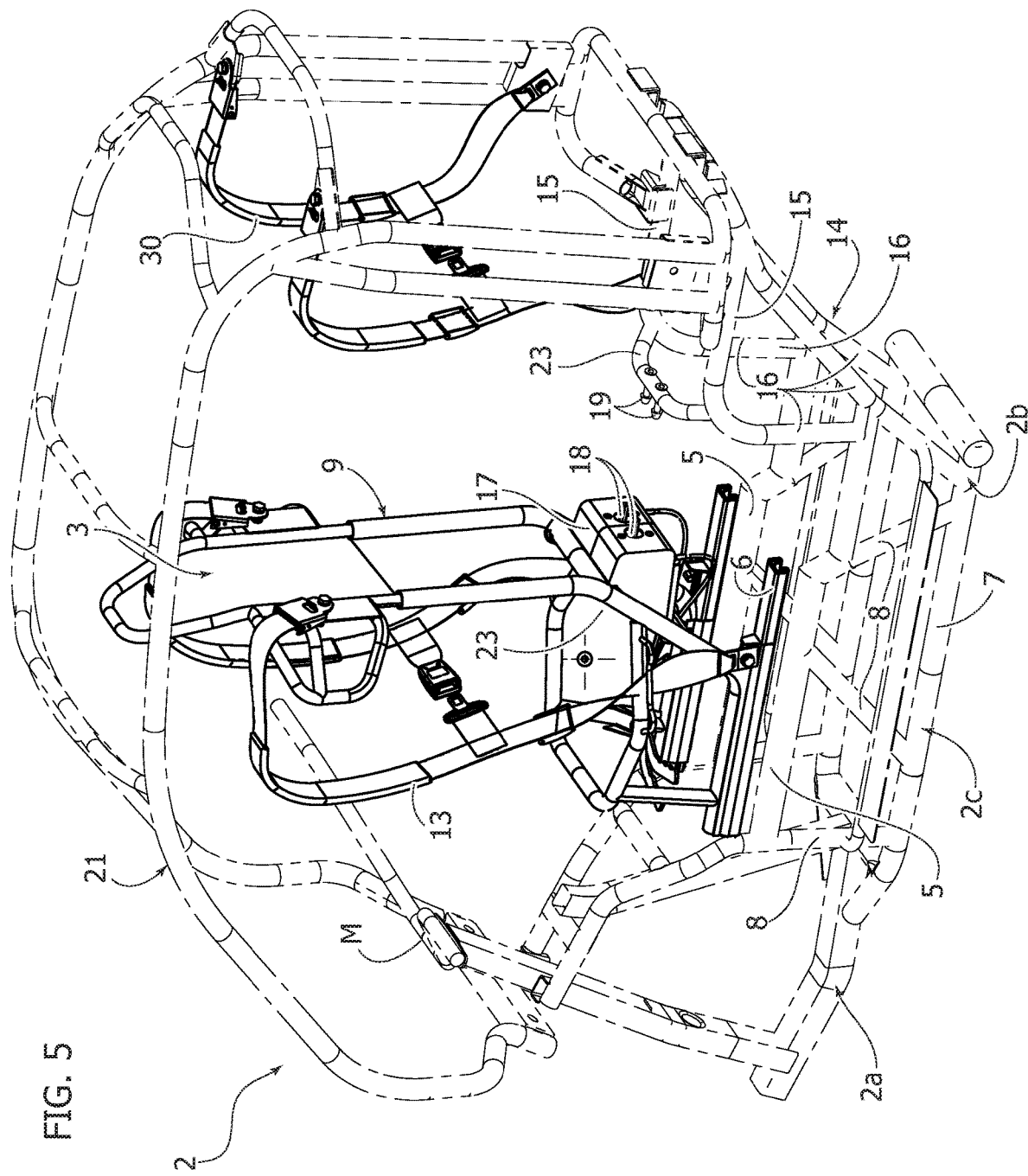

The front seat 3 is installed on the guide 6 carried by the central frame portion 2c so that it is movable between the rearward position represented in FIG. 4 and the forward position represented in FIG. 5.

Figure 6:
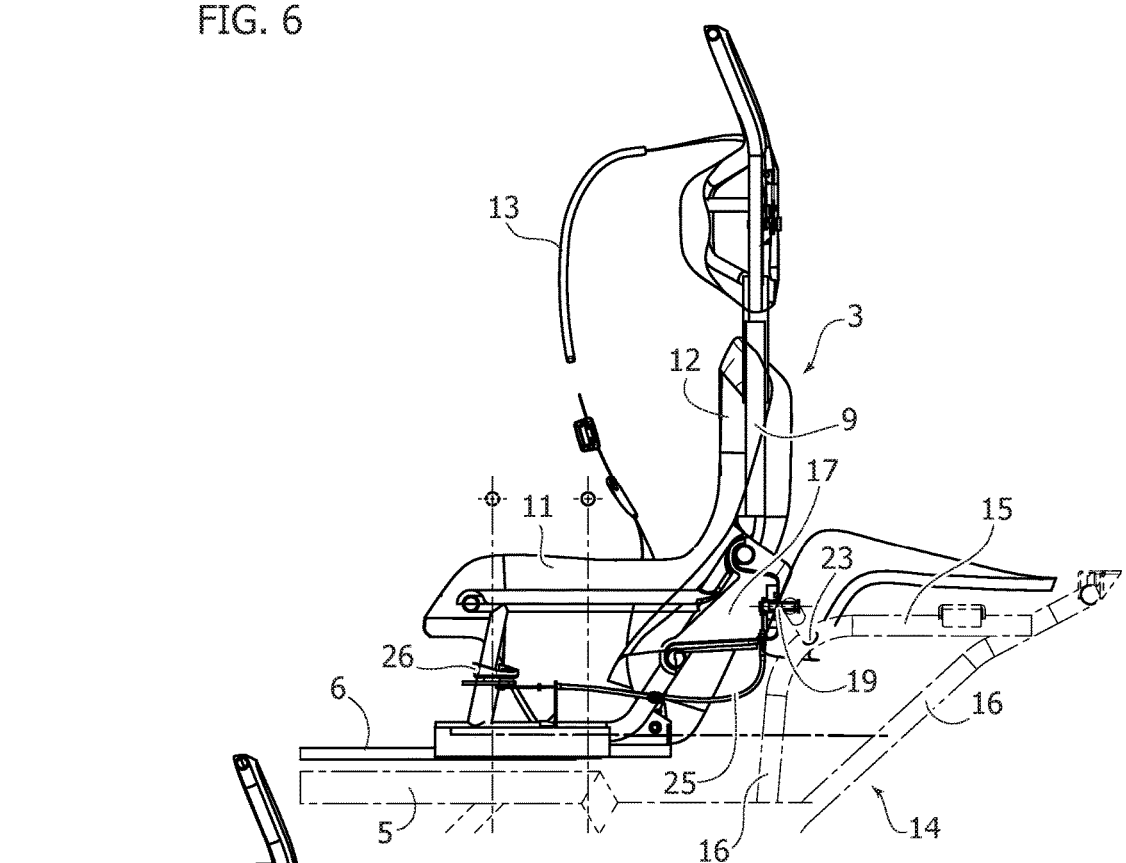
FIGS. 6 and 7 are side elevational views—on an enlarged scale—of a part of FIG. 4 and of a part of FIG. 5, respectively.

More in particular, and with reference to FIG. 6, the front seat 3 is represented in the rearward position which corresponds to a driving configuration of the vehicle 1, in which the appendage 17 of the front seat 3 is in contact with the frame 14 of the rear seat 4 so that the pins 19 supported by the crosspieces 15 of the rear seat 4 engage the corresponding holes 18 of the rear appendage 17 of the front seat 3 and they are retained therein by means of the locking elements 10.

In this configuration, the frame 9 of the front seat 3 and the frame 14 of the rear seat 4 are rigidly secured to each other as if they were a single frame, with the particular advantage lying in the fact that, in the event of frontal collision of the vehicle 1, the tensile loads that occur on the safety belts 13 of the front seat 3 due to the inertia of the driver G are transferred to the frame 14 of the rear seat 4, ensuring the safety of the driver G.

Figure 7:
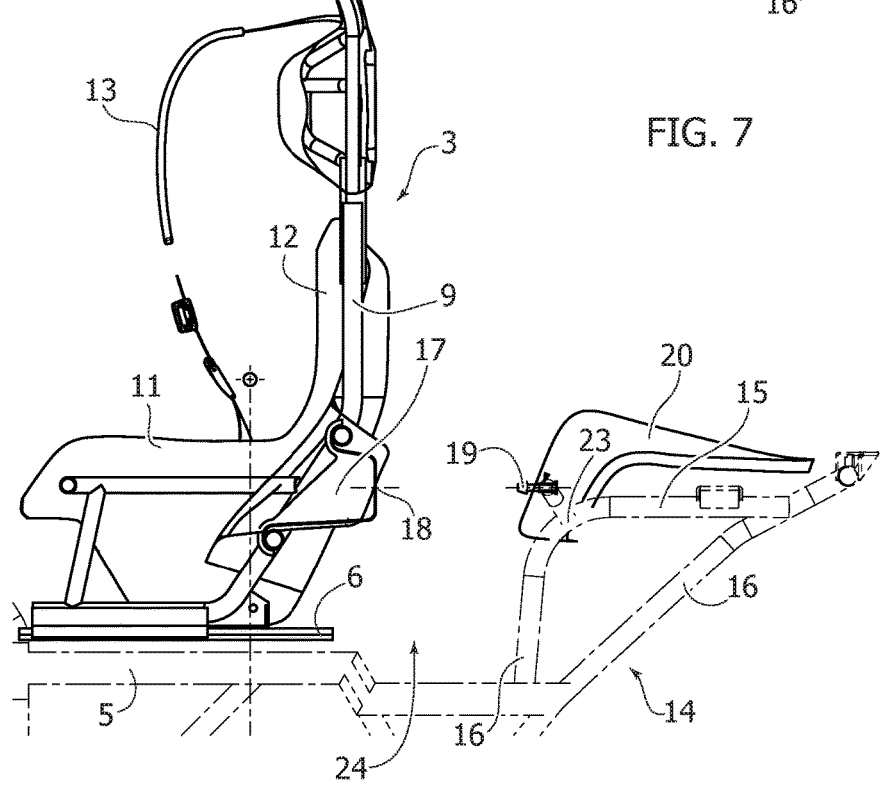

In FIG. 7, the front seat 3 is represented in the forward position corresponding to a configuration for the access and exit of the passenger P to/from the rear seat 4. When the front seat 3 is in such forward position, there is formed a space 24 free of obstacles between the front seat 3 and the rear seat 4, which facilitates the access of the passenger P, who will not be forced to overcome obstacles with the legs thereof before being able to occupy the rear seat 4.

Thanks to this solution idea, the vehicle 1 according to the invention reveals the advantages of a motor vehicle, such as the manoeuvrability conferred by the distinctive features of a motorcycle chassis, while having the convenience of access and exit, in particular for the passenger P, and the pair of seats provided with a backrest, typical of a car.

Figure 8:
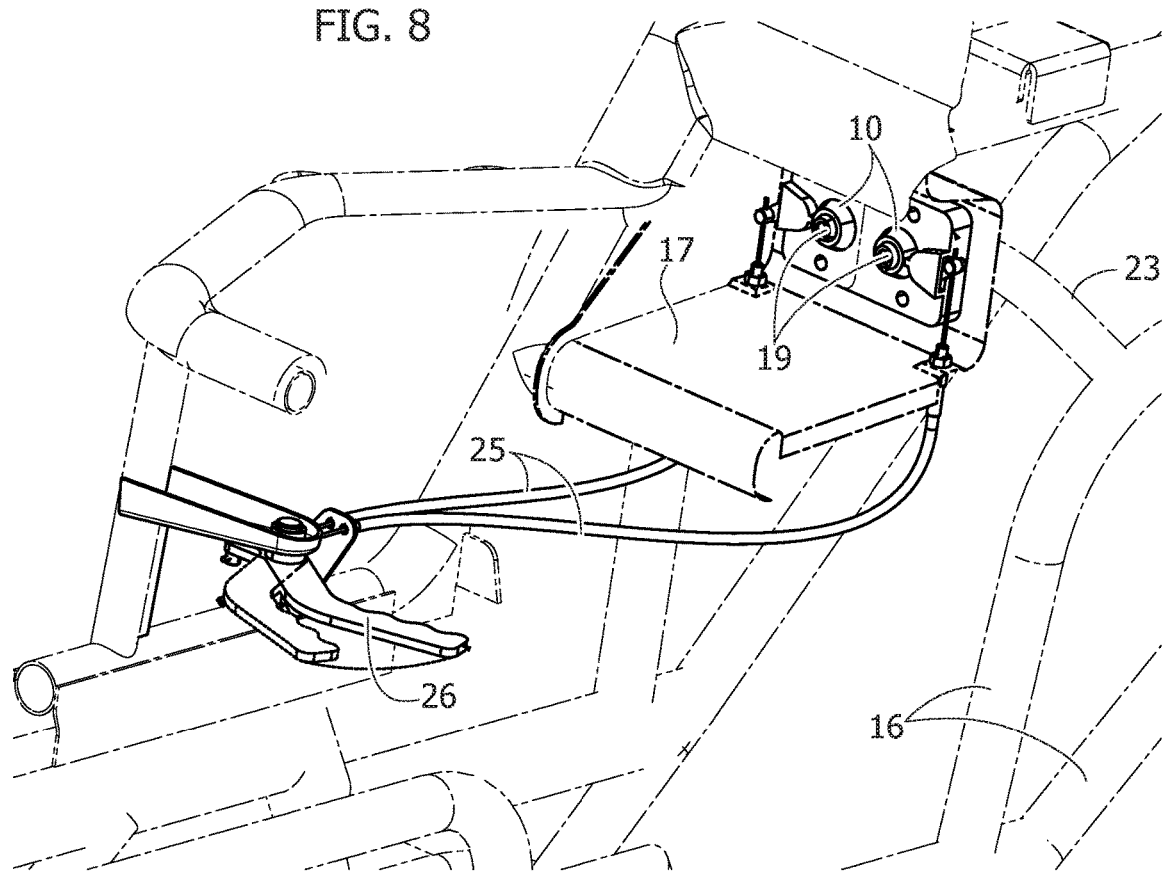
FIG. 8 is a partially sectional perspective view of a part of FIG. 4.
Figure 9:
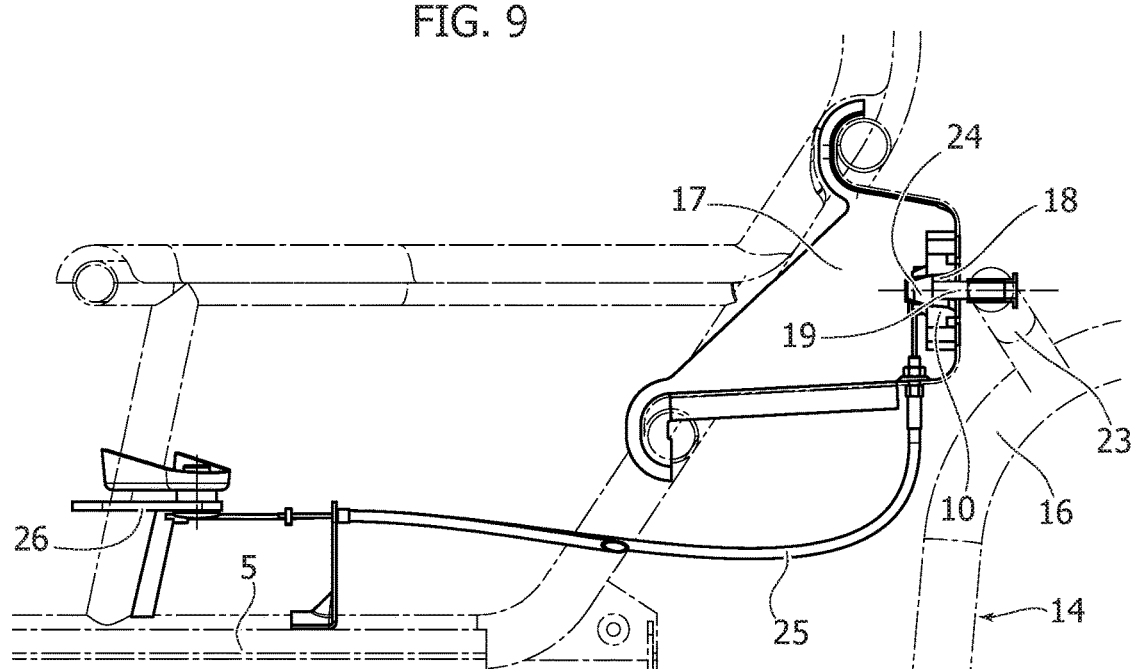
FIG. 9 is a lateral elevational view of FIG. 8.

With reference to the rearward position of the front seat 3 shown in FIGS. 8 and 9, below is a detailed description of a first embodiment of the releasable locking device according to the invention, comprising the pins 19 and the holes 18. Each of the pins 19 comprises a stem which extends from the support 23 of the rear seat 4 and ends with a frustoconical head 24. In the driving position of the front seat 3, the frustoconical head 24 of each of the stems is engaged by the locking elements 10 of the corresponding hole 18 provided for in the appendage 17 of the front seat 3. The locking elements 10 of each hole 18 can be released by means of a respective cable 25 of a flexible transmission actuated by a lever 26 pivoted to the frame 2.

In light of the above and starting from an operative condition of the vehicle 1, that is with the rear seat 4 in the rearward configuration, below is the description of the procedure to allow a passenger P to occupy the rear seat 4.

First and foremost, one has to release the pins 19 from the respective holes 18 using the lever 26, allowing the seat 3 to slide on the guide 6 until it reaches the forward position thereof. The access space 24 cleared by the forward movement of the seat allows the passenger P to easily occupy the rear seat 4 without encountering any obstacles for the legs.

The seat 3 must then be returned to the rearward configuration, by making it slide on the guide 6 and engaging and locking the pins 19 in the respective holes 18.

The same procedure may be repeated to allow the passenger P to get off vehicle 1.

Figure 10:
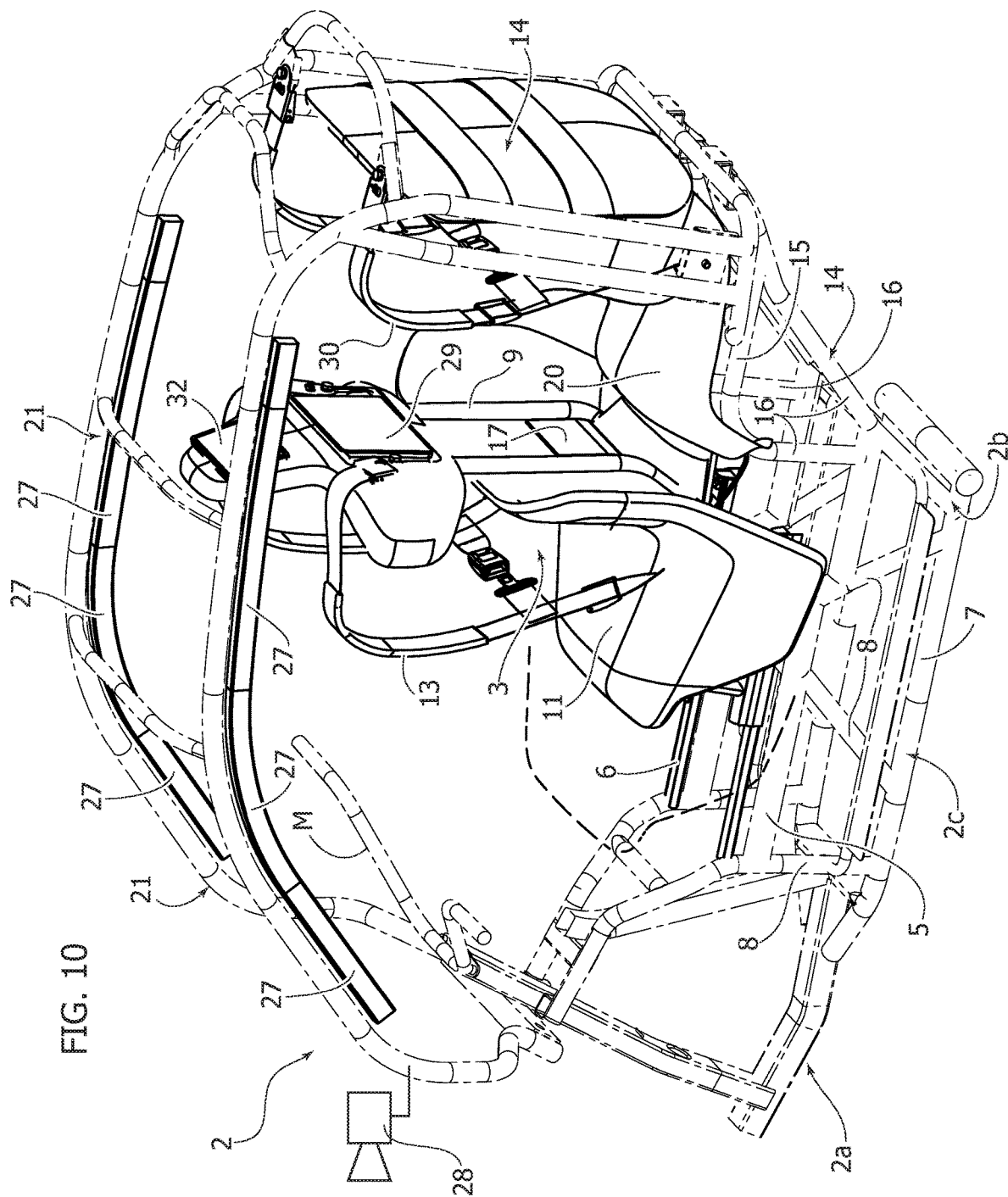
FIG. 10 shows a variant of FIG. 4.
Figure 11:
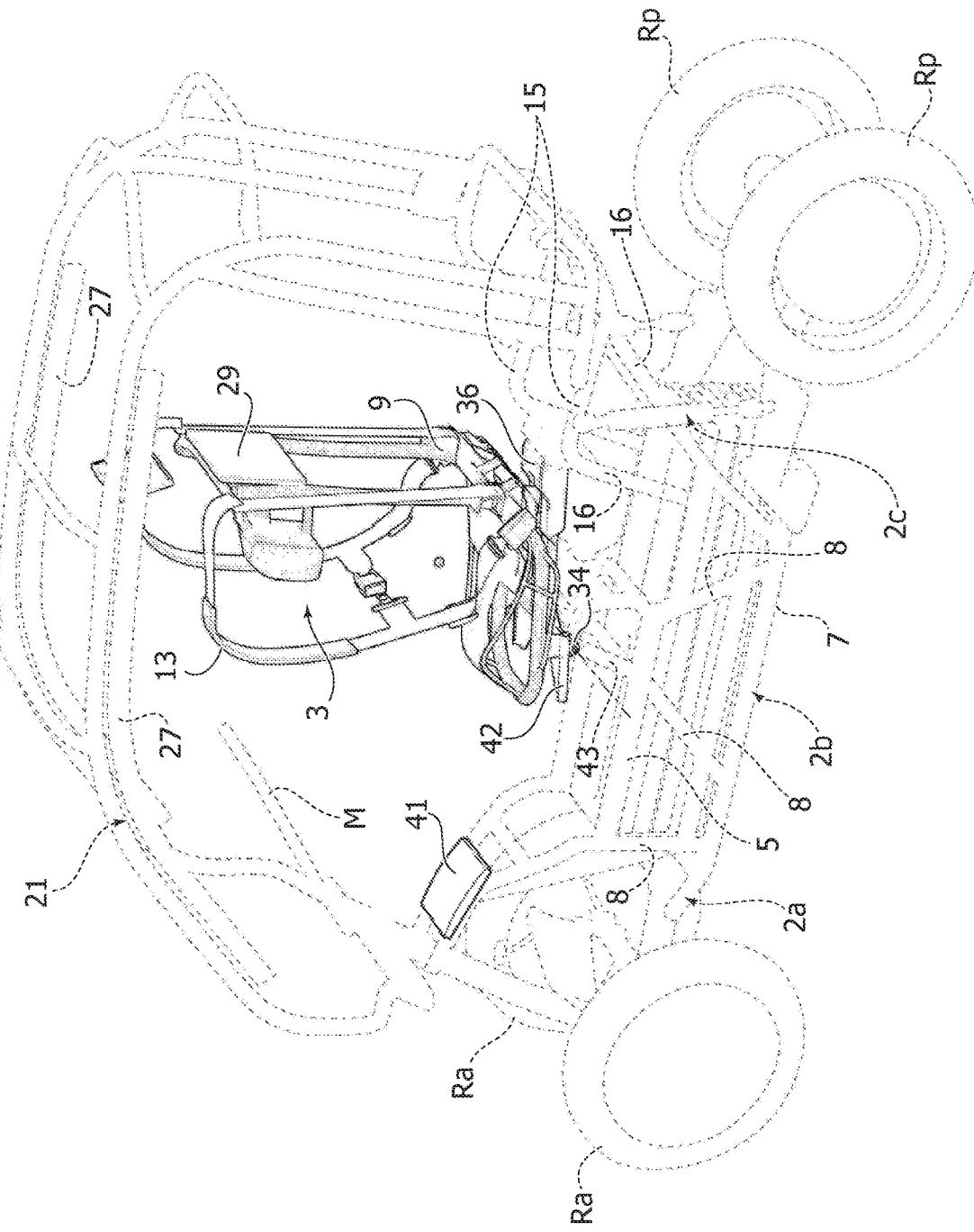
FIG. 11 is a schematic perspective view of a second embodiment of the vehicle structure according to the invention.

The difference between the variant of the invention represented in FIG. 10 and the embodiment of FIG. 4 lies in the fact that the frame 21 for the roof 22 is provided with three pairs of side airbags 27 arranged to protect the driver G and the passenger P in the event of side collisions and a front airbag 29 carried by the backrest 12 of the front seat 3 to protect the passenger P in the event of a frontal collision. Furthermore, FIG. 11 shows a further front airbag 41 carried by the front frame portion 2a to protect the driver G in the event of a frontal collision or with a minimal side component.

Furthermore, in the variant of the invention represented in FIG. 10, provided for is a front video camera 28 installed in the front part of the frame 2 and arranged to send images in real time to a monitor 32 carried by the backrest 12 of the front seat 3. This allows passenger P to view the road ahead of vehicle 1, minimising any feeling of malaise that may occur during the journey.

FIGS. 11-15 show a second embodiment of the vehicle structure 1 according to the invention in which parts identical or similar to those already described previously are indicated using the same reference numerals.

Figure 12:
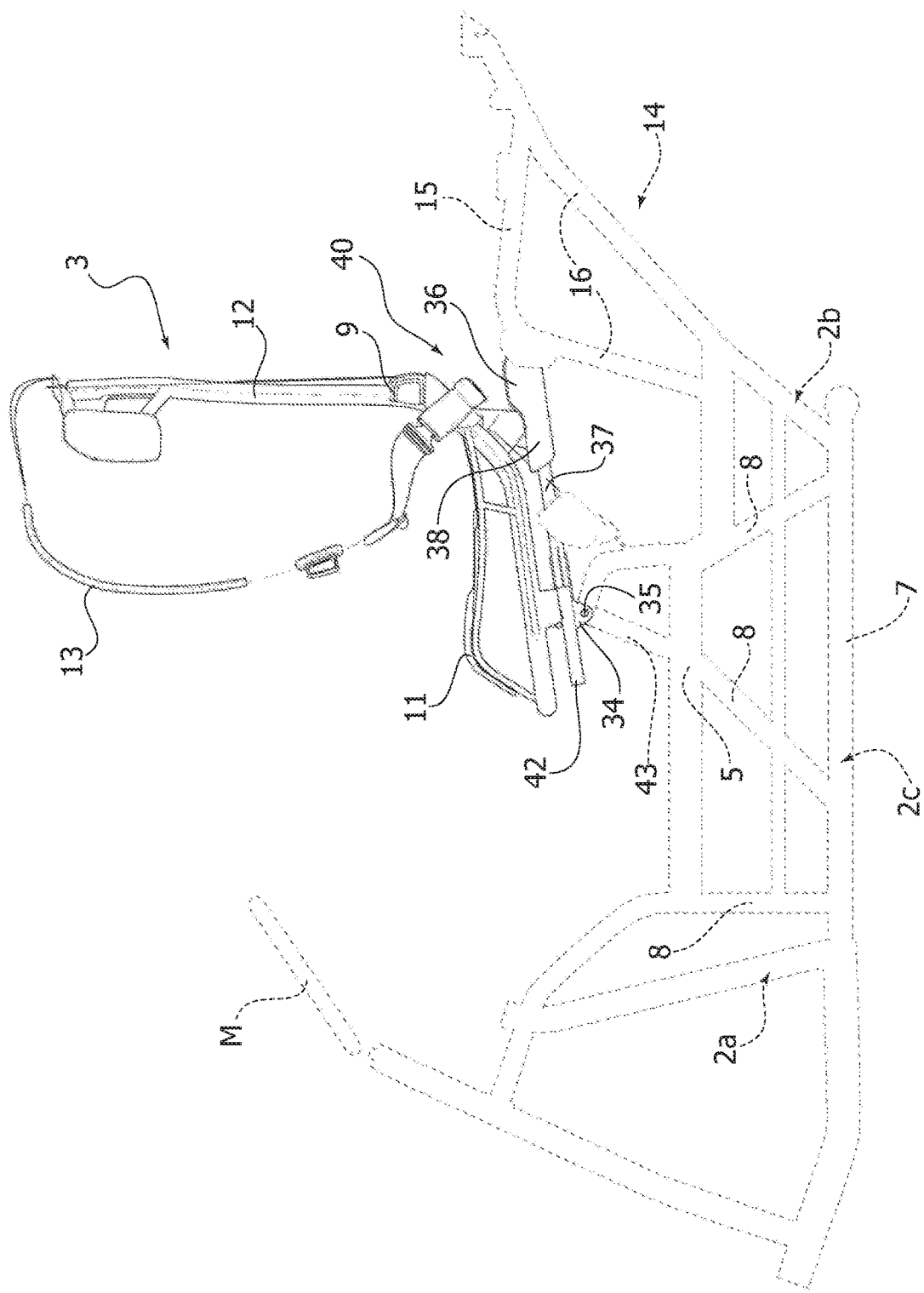
FIGS. 12 and 13 are side elevational views of a part of FIG. 11 showing two different configurations of the front seat.
Figure 13:
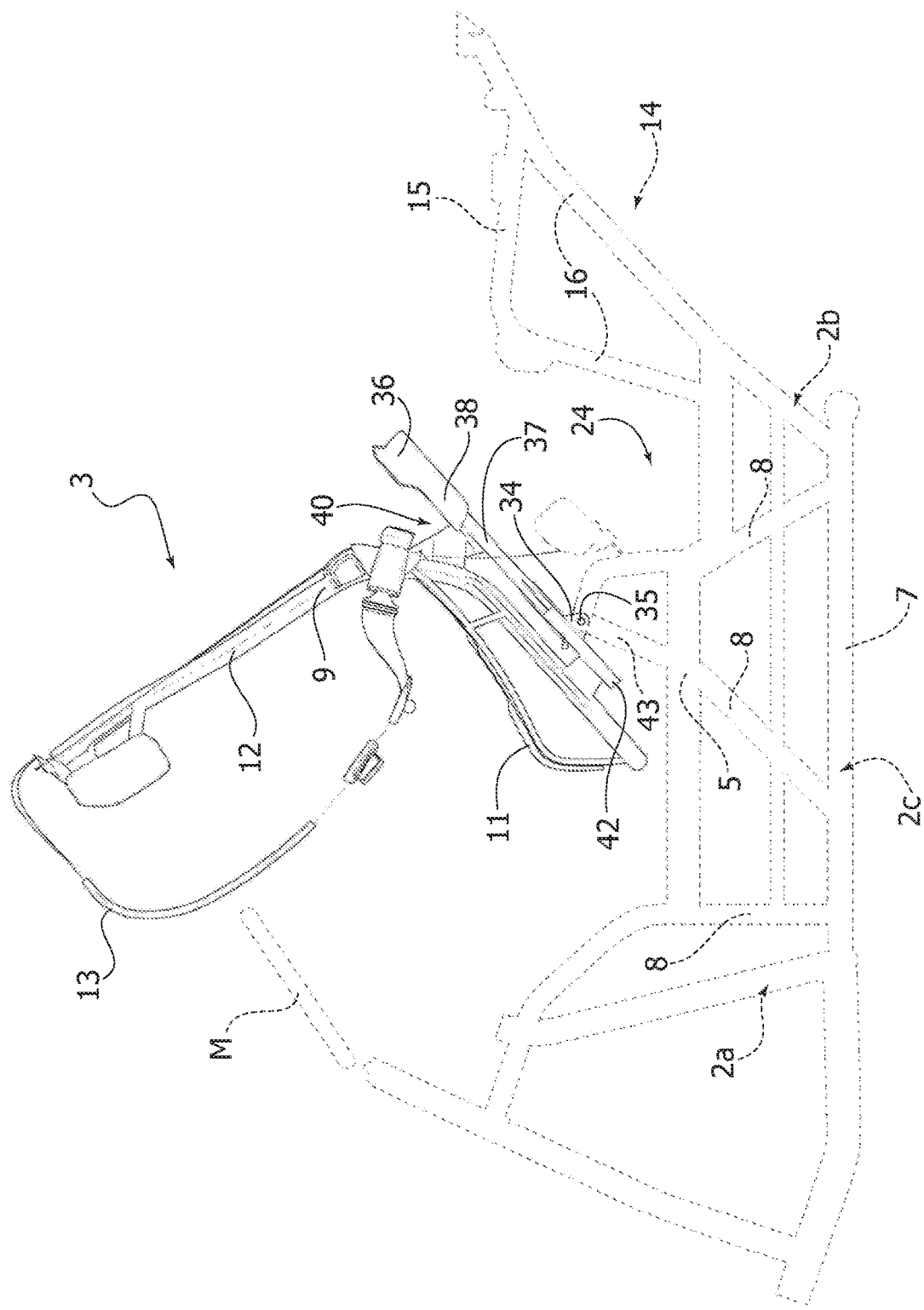

As better observable in FIGS. 12 and 3, the central frame portion 2c comprises a pair of upper crosspieces 5 supporting respective supports 43 for a device 40 for driving, adjusting and tilting the front seat 3, as will be described hereinafter, a pair of lower crosspieces 7, and three pairs of uprights 8 connecting the pairs of crosspieces 5, 7 so as to form—therewith—a box-like structure for housing batteries B if required.

Figure 14:
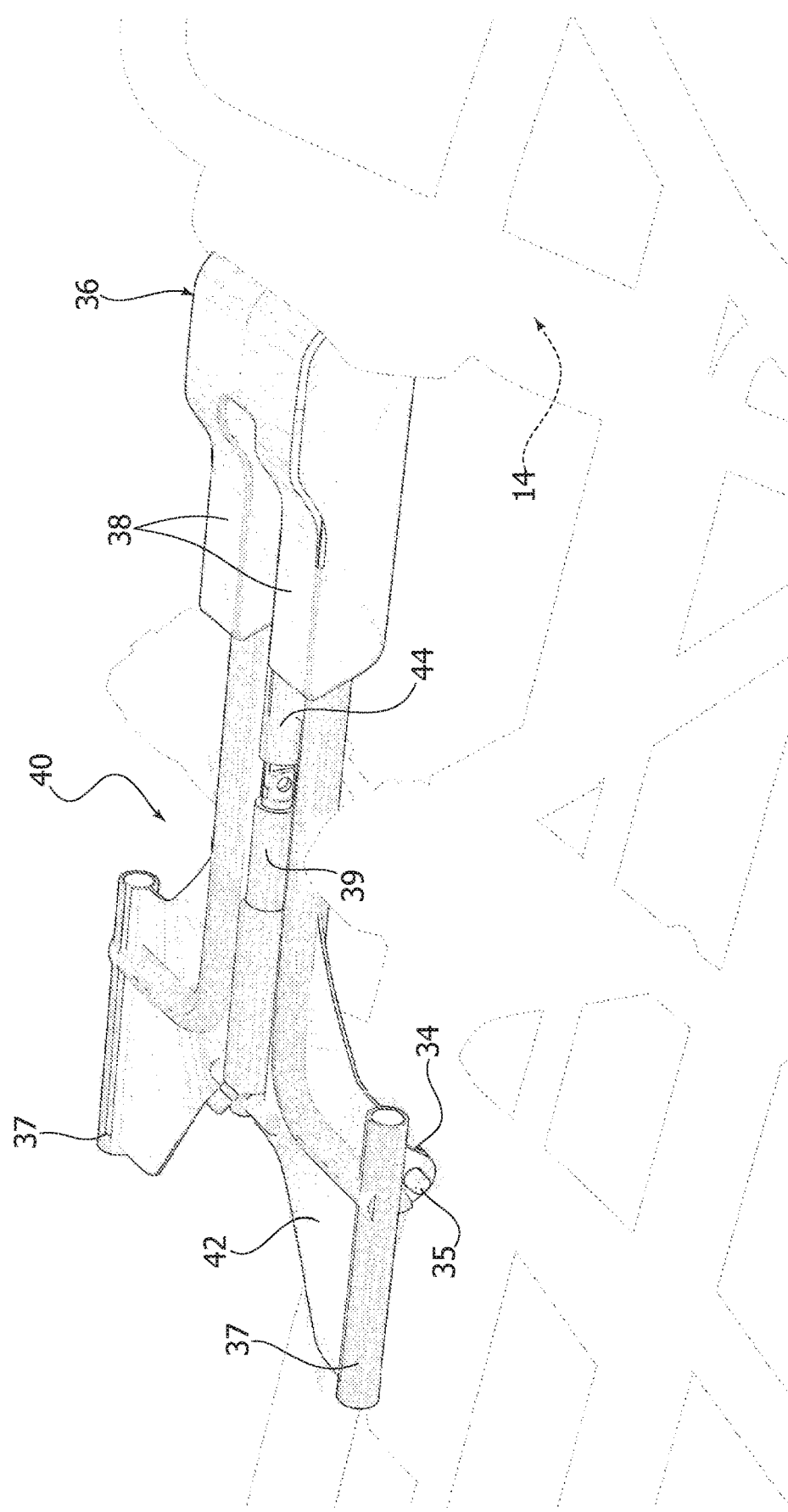
FIG. 14 is a perspective view—on an enlarged scale—of some details of FIG. 11.

With reference to FIG. 14, below is a detailed description of the device 40 for driving, adjusting and rotating the front seat 3 according to the second embodiment of the invention. The device 40 consists of an elongated body comprising—at an end thereof—a conventional electronic lock 36 arranged to be engaged with the at least one pin 19 integrally joined with the frame 14 of the rear seat 4 in the driving position of the vehicle 1. Such electronic lock 36 may conveniently be actuated by using an electronic device such as a mobile phone, tablet and the like to release the lock of the front seat.

The device 40 further comprises, at the end thereof opposite to the lock, an intermediate frame 42 for supporting the front portion of the sitting portion 11 of the front seat 3. The intermediate frame 42 comprises a pair of side sleeves 37 and a central sleeve 44 arranged to adjust the distance between the front seat and the rear seat 4 as a function of the height of the driver by means of a linear electric actuator 39. The intermediate frame 42 is posteriorly connected a fork 38 protruding from the lock 36. Also the linear electric actuator 39 may conveniently be actuated by using an electronic device such as a mobile phone, tablet and the like. As better observable in FIGS. 12 and 13, the device 40 further comprises a pair of brackets 34 protruding from the intermediate frame 42 and hinged with a pair of pins 35 integrally joined with the respective supports 43. Thus, with reference to FIG. 13, the front seat 3 may be tilted with respect to a transverse axis T (visible in FIG. 13) in the configuration for the access and exit of the passenger P into/from the rear seat 4. When the front seat 3 is in such tilted position, there is formed a space 24 free of obstacles between the front seat 3 and the rear seat 4, which facilitates the access of the passenger P, who will not be forced to overcome obstacles with the legs thereof before being able to occupy the rear seat 4.

In light of the aforementioned second embodiment of the vehicle structure 1 according to the invention and starting from an operative condition of the vehicle, that is with the rear seat 4 in the driving configuration, below is the description of the procedure to allow a passenger P to occupy the rear seat 4.

First and foremost, one has to unlock the electronic lock 36 for example by means of a mobile phone, allowing the seat 3 to rotate with respect to the pins 35 until it reaches its tilted position. The access space 24 cleared by the rotation of the seat allows the passenger P to easily occupy the rear seat 4 without encountering any obstacles for the legs. The seat 3 must then be returned to the driving configuration, by making it rotate and engaging and locking the pins 19 using the electronic lock 36. The same procedure may be repeated to allow the passenger P to get off vehicle 1.

Figure 15:
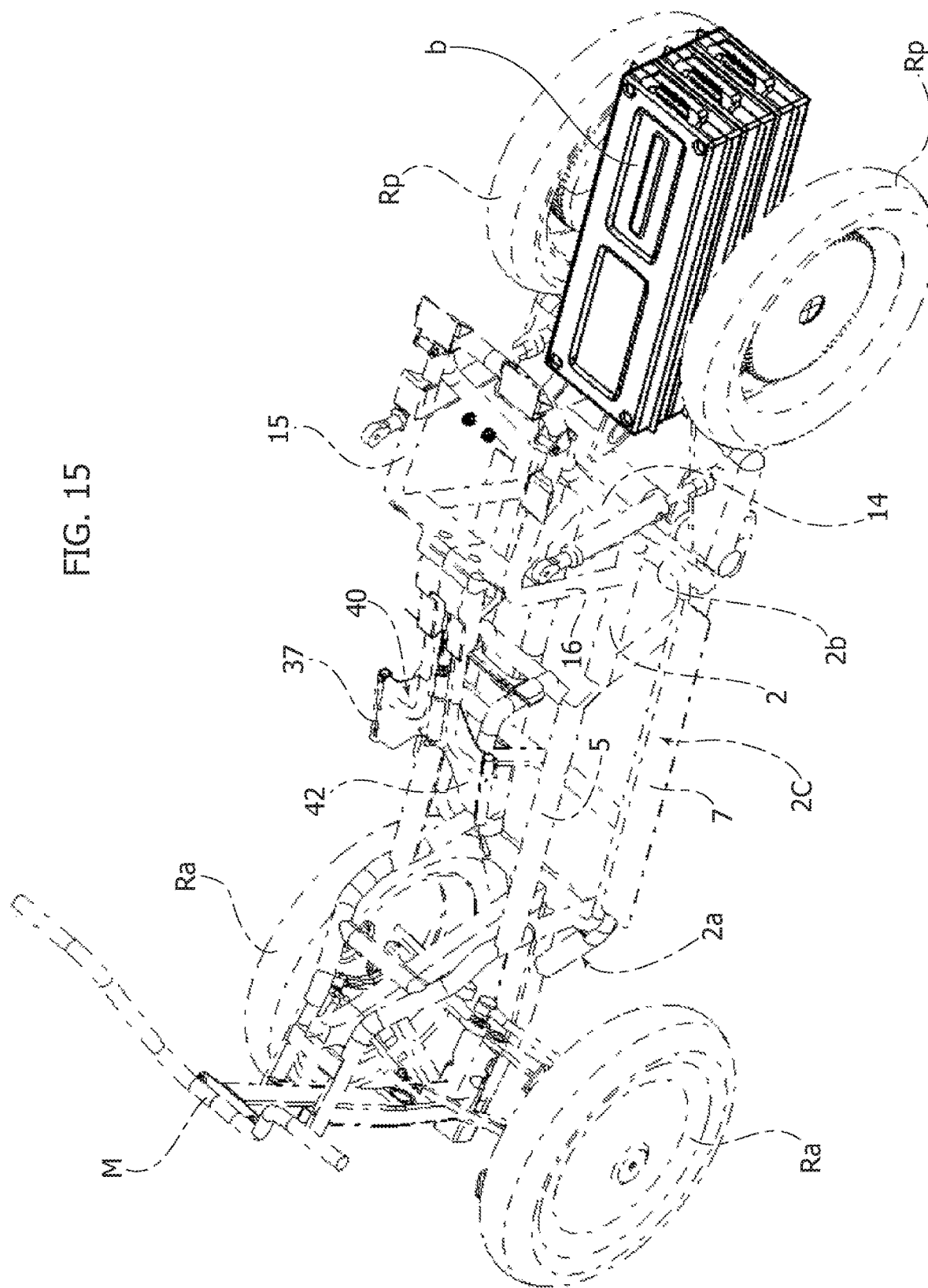
FIG. 15 is a perspective view—on an enlarged scale—of a part of the vehicle structure according to the invention showing a variant of the battery according to the invention.

In a further embodiment according to the invention, visible in FIG. 15, at least one of the batteries B can be removed from the structure 5,7 arranged to house the batteries B so as to slide posteriorly between the rear wheels for replacement. In particular, when the vehicle structure according to the invention comprises a pair of rear driving wheels Rp, the rear overall dimensions of the mechanics are limited to the minimum, allowing through-passing by sliding—in a drawer-like fashion—the battery B during replacement hence allowing a fast restart of the vehicle if necessary, without taking time to recharge.

Figure 16:
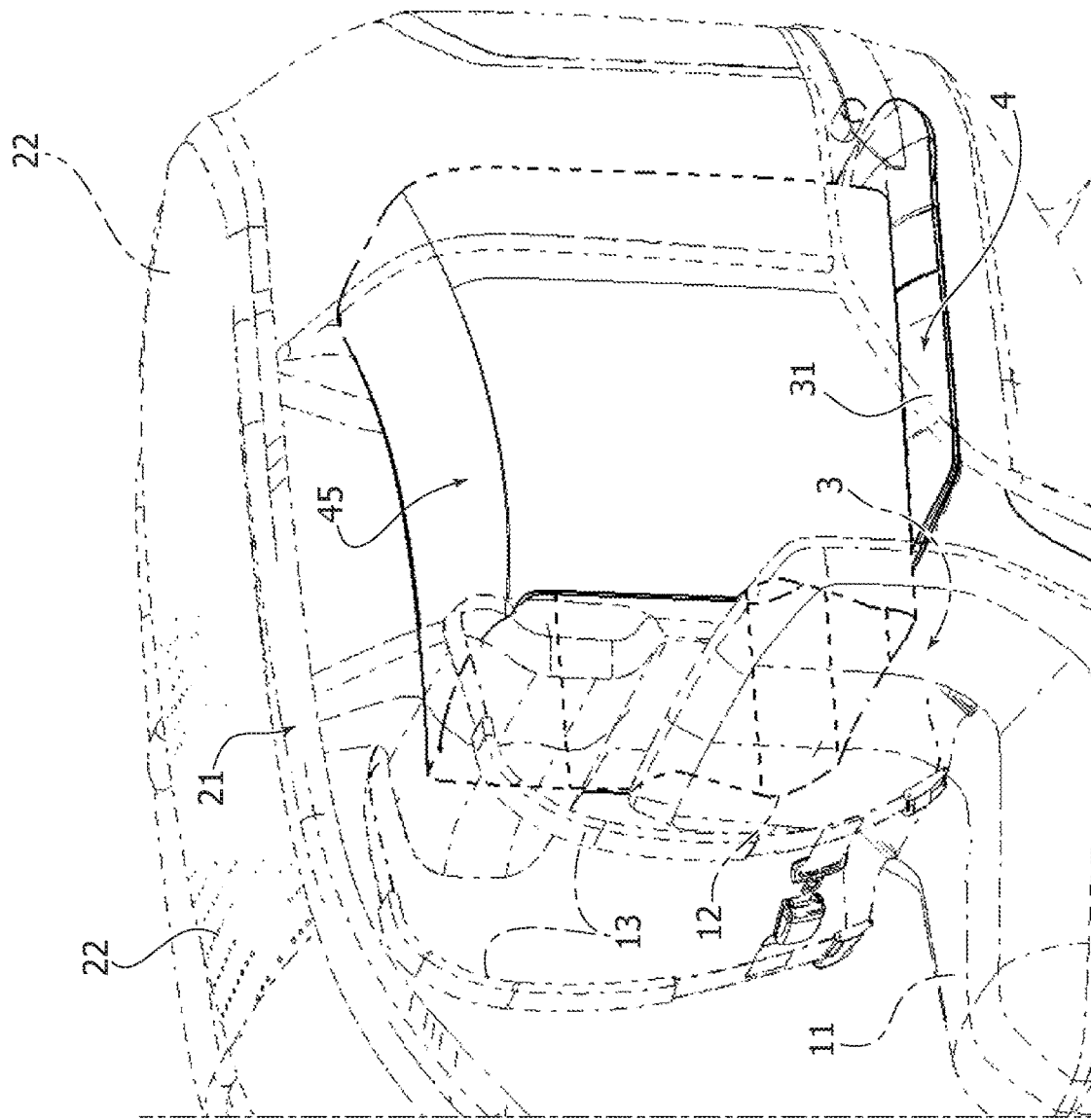

In further embodiments of the invention represented in FIGS. 16 and 17, the vehicle structure comprises two variants of a storage compartment 45, suitable to increase the volume for transporting objects, provided—by way of non-limiting example—by means of a container made of fabric 45.

In a first variant shown in FIG. 16, the compartment 45 can be converted from a first closed configuration, in which it is stowed behind the backrest 31 of the rear seat 4, to a second open operative configuration in which the compartment 45 rests on the sitting portion 20 of the rear seat 4. In particular, the compartment 45 is arranged behind the backrest 31 of the rear seat 4 and anchored on the frame 15 located behind it; during use, it is opened by folding backrest 31 and possibly anchored in an upper portion of the backrest 12 of front seat 3, hence increasing the capacity of the trunk.

In a second variant shown in FIG. 17, the compartment 45 can be converted from a first closed configuration, in which it is stowed in the external trunk, to a second open operative configuration in which the compartment 45 protrudes posteriorly from the rear part 46 of the frame 21. In particular, the compartment 45 is arranged inside the lid of the external trunk and anchored on the frame located behind it; during use it is opened using same lid opening, hence increasing the load capacity thereof.

Obviously, the construction details and the embodiments may widely vary with respect to what has been described and illustrated, without departing from the scope of protection of the present invention as defined in the claims that follow. Thus, for example, the general conformation of the frame of the vehicle 1 could be different from the one represented in the drawings.

The invention claimed is:

1. Vehicle structure comprising:
a frame having a longitudinal axis, a front frame portion carrying at least one front wheel steered by means of a handlebar, a rear frame portion carrying at least one rear wheel, and a central frame portion carrying a guide parallel to said longitudinal axis,
a single front seat for a driver and a single rear seat for a passenger aligned with each other along said longitudinal axis, wherein the front seat is slidable longitudinally along said guide between a rearward position and a forward position, each of said seats comprising a frame, a sitting portion and a backrest, wherein, in said rearward position, the front seat is in contact with the frame of the rear seat and is rigidly secured thereto by means of a releasable locking device, and in said forward position of the seat a longitudinal space relative to said guide is formed between the front seat and said frame of the rear seat to facilitate access and exit of the passenger.

2. Vehicle structure according to claim 1, wherein said front seat is tiltable with respect to a transverse axis between a rearward driving position of the vehicle and a forward position to facilitate the access and exit of the passenger.

3. Vehicle structure according to claim 2, wherein said front seat comprises at least one bracket projecting from the frame of the front seat, said at least one bracket being coupled to at least one corresponding pin integrally joined with said central frame portion, or vice versa.

4. Vehicle structure according to claim 1, wherein said front seat is provided with safety belts, wherein in that in the event of frontal collision of the vehicle said locking device is configured to transfer the tensile loads that occur on the safety belts to said frame of the rear seat.

5. Vehicle structure according to claim 1, wherein said releasable locking device comprises at least one pin integrally joined with said frame of the rear seat and at least one corresponding hole provided in an appendage protruding from said front seat.

6. Vehicle structure according to claim 5, wherein said locking device can be released by means of a lever arranged to actuate said locking elements so as to release said pin.

7. Vehicle structure according to claim 1, wherein said releasable locking device comprises an electric lock which can be actuated by using an electronic device such as a mobile phone, tablet and the like.

8. Vehicle structure according to claim 1, wherein said front seat guide comprises an intermediate frame comprising a pair of side sleeves and a central sleeve which allow the front seat to slide—by means of a linear electric actuator—to adjust the distance between said front seat and said rear seat, said intermediate frame being connected to a fork carried by said frame of the front seat, said linear electric actuator being actuatable by means of an electronic device such as mobile phone, tablet and the like.

9. Vehicle structure according to claim 8, wherein said fork, said sleeves, said linear actuator, and said intermediate frame are comprised in a single device integrally joined with said frame of said front seat.

10. Vehicle structure according to claim 1, wherein said vehicle comprises two, three or four wheels.

11. Vehicle structure according claim 1, wherein said vehicle is driven by at least one electric, internal-combustion or hybrid engine.

12. Vehicle structure according to claim 1 comprising a frame for a roof wherein said frame is provided with at least one pair of side airbags arranged to protect the driver and the passenger in the event of side collisions and/or said vehicle structure comprises at least one front airbag carried by the backrest of the front seat to protect the passenger in the event of a frontal collision, and/or at least one front airbag carried by said front frame portion or by said handlebar to protect the driver in the event of frontal collision.

13. Vehicle structure according to claim 1 further comprising a front video camera and a monitor or TFT (Thin Film Transistor) supported by said backrest of the front seat, the images of said video camera being transmitted in real time on said monitor so as to provide the passenger with the view of the route.

14. Vehicle structure according to claim 9 wherein said central frame portion comprises a pair of upper crosspieces supporting said guide or said device of the front seat, a pair of lower crosspieces, a plurality of uprights connecting said pairs of crosspieces so as to form-therewith-a structure arranged for housing batteries if required.

15. Vehicle structure according to claim 5 wherein said frame of the rear seat comprises a pair of upper crosspieces supporting said sitting portion of the rear seat, a plurality of uprights connecting said pair of crosspieces to said central frame portion, and a support horizontally connecting said pair of crosspieces to each other and supporting said at least one pin.

16. Vehicle structure according to claim 9 wherein said space formed between the front seat and the frame of the rear seat in said forward position of the front seat extends inferiorly and posteriorly to said upper crosspieces supporting said guide or said device of the front seat.

17. Vehicle structure according to claim 12, further comprising a flexible storage compartment, said compartment being convertible from a first closed configuration, in which it is stowed either behind the backrest of the rear seat or inside an external trunk, to a second open operative configuration in which said compartment rests on the sitting portion of said rear seat, or it protrudes posteriorly from the rear part of said frame for said roof.

18. Vehicle structure according to claim 14 further comprising a first battery of said batteries and rear wheels, wherein said first battery is removable from said structure arranged to house the battery so as to slide posteriorly between said rear wheels for replacement.

19. Vehicle structure according to claim 1, wherein said front seat comprises a front end and a rear end, said front end and said rear end connected to said guide in said forward position.

* * * * *